United States Patent [19]

Chang

[11] 4,267,052
[45] May 12, 1981

[54] AERATION METHOD AND APPARATUS

[76] Inventor: Shih-chih Chang, 2339 Davison Ave., Richland, Wash. 99352

[21] Appl. No.: 101,709

[22] Filed: Dec. 10, 1979

[51] Int. Cl.³ .............................................. C02F 3/16
[52] U.S. Cl. .................................. 210/629; 210/208; 210/219; 261/87; 261/91; 261/93; 261/DIG. 75
[58] Field of Search ....................... 210/3, 6, 7, 14, 15, 210/63 R, 194, 199, 205, 208, 218, 219, 220, 221 M, 221 P; 261/87, 91, 93, DIG. 75, 85, 88; 435/312–316, 818

[56] References Cited

U.S. PATENT DOCUMENTS

| 3,827,679 | 8/1974 | Kaelin | 210/15 |
| 3,954,606 | 5/1976 | Block et al. | 210/14 |
| 4,017,565 | 4/1977 | Muller | 261/93 |
| 4,029,724 | 6/1977 | Muller et al. | 261/DIG. 75 |
| 4,051,204 | 9/1977 | Müller et al. | 261/93 |

FOREIGN PATENT DOCUMENTS

| 279508 | 3/1970 | Austria | 210/220 |
| 2559236 | 7/1977 | Fed. Rep. of Germany | 210/219 |

Primary Examiner—Peter A. Hruskoci

[57] ABSTRACT

A method of and an apparatus for aerating and circulating a liquid in a vessel comprising utilizing a surface aerator and a bottom mixing rotor mounted on a hollow common shaft. The rotor entrains liquid and air into the hollow center of the common shaft from the liquid surface region and affects a downward two-phase flow in the hollow center. The gas-liquid mixture is subsequently injected into the liquid body through the channels of the rotor which communicate with the hollow center of the shaft. The discharged jet streams disperse the entrained gas bubbles throughout the liquid body and provide turbulent mixing in the bottom section of the vessel. The present invention not only provides sufficient bottom mixing but also enhances the mass transfer efficiency of the surface aeration by enriching the gas content in the surface layer of the liquid.

6 Claims, 1 Drawing Figure

AERATION METHOD AND APPARATUS

BACKGROUND OF THE INVENTION

The present invention generally relates to a process and an apparatus for transfering a gas into a liquid body, in particular, the invention relates to aeration of industrial and municipal wastewater in the activated sludge process.

The activated sludge process for wastewater treatment comprises stablizing the wastewater impurities by means of aerobic biological growth. Adequate quantity of oxygen must be supplied to the microbial cells in order to keep them continuously digesting the organic impurities. At the same time, the treated liquid must be kept in sufficient mixing throughout the reactor so that the suspended biomass will not settle out from the reacting liquid. Therefore a properly designed aeration system must satisfy two process requirements, namely supplying desired amount of oxygen to the liquid and providing overall liquid mixing in the reactor.

It is well known that the aeration of activated sludge can be accomplished by mechanical surface aerators. A surface aerator contains a rotational shaft carrying a partially submerged rotor with a number of agitating blades. Said blades continously motivate the surface liquid and spray it in the gas space to form a jet layer. The jet layer, which is constantly renewed by the rotor, contacts with the oxygen contained gas and thereby results in oxygen dissolution in the liquid. As the jet impinges the liquid surface it entrains a quantity of gas pockets in the liquid surface layer, while the impact of the impingement produces surface turbulence which promotes a intimate contact between the liquid and the entrained gas bubbles. In general, the quantity of the gas bubbles are limited by the jet impingement which is insufficient to provide a optimum mass transfer efficiency. Therefore the performance of surface aerators can be further improved by introducing additional gas to the surface layer of the liquid.

Because a surface aerator has a relatively simple mechanical arrangement, it enjoys a growing popularity in the modern wastewater industry. However there is also a fundamental shortcoming: The liquid circulation is limited to the surface layer and the aeration basin has inhomogeneous oxygen distribution and insufficient mixing in the bottom portion. Under this situation, a part of the solids will settle out and accumulate on the basin bottom. The settlement of solid is very undesirable from the standpoint of activated sludge process for it develops an anaerobic reaction condition. The generally known solution to this problem is to add a bottom mixer to the common shaft of the surface aerator. However, the additional bottom mixers are disposed close to the bottom of the basin, it can only perform bottom mixing but not oxygen transfer, for no gas bubbles can penetrate to the bottom section. Therefore the power consumed by the bottom mixer does not contribute additional oxygen transfer and the overall mass transfer efficiency is sharply reduced. From the standpoint of oxygen transfer it is beneficial to introduce extra gas to the bottom section of the reactor so that the mixing power of the bottom mixer can be utilized for oxygen transfer. A part of the introduced gas will be dissolved in the bottom mixing zone and the undissolved gas bubbles will rise to the surface layer of the liquid to enhance the mass transfer of the surface aerator. However, the operation of injecting gas into the liquid bottom section can not be carried out without additional complicated mechanical system in the conventional manner. In order to overcome the hydrostatic pressure, the injected gas must be pressurized by a blower such as described in U.S. Pat. No. 3,827,679. The extra costs of the blower and the gas pipe line in this patented system must be spent in addition to the surface aeration reactor and therefore the advantage of the high efficiency of oxygen transfer is counter-balanced by the high capital costs and the complicated mechanical system.

The ideal system for enhancing the surface aeration and providing bottom mixing would include a novel means of gas injection which requires no additional prime mover. The present invention provides an aeration method and apparatus which have the features of the above stated ideal system.

OBJECTS OF THE INVENTION

The general object of the present invention is to provide an efficient method of and apparatus for transfering a gas into a liquid and maintaining an effective overall liquid circulation.

A specific object of the present invention is to utilize a submerged rotor to inject a number of rotary jets of a gas-liquid mixture for promoting bottom mixing and affecting an efficient gas-liquid mass transfer.

Another specific object of the present invention is to interact the bottom gas injection with a surface aerator for achieving a mass transfer enhancement.

Still another specific object of the present invention is to utilize the rotational shaft of the surface aerator to supply and transmit the power for bottom mixing and gas injection so that no additional prime mover is required.

SUMMARY OF THE DISCLOSURE

The present invention described herein uses a rotational hollow shaft for driving a rotor submerged in the liquid near the bottom of the reactor. Said rotor has a plurality of radially outward channels which generate centrifugal force and pumping action. The hollow center of the hollow shaft has an opening to said liquid near the liquid surface and an opening to the gas space above the liquid surface. The hollow center communicates with inward end of the channels of the rotor so that the passages for gas and liquid from upper section of the reactor through the hollow center to the rotor channels are provided. With the pumping action of the rotor, the liquid is drawn to enter the hollow center through the liquid opening and flow downwardly therein. There is a gas entraining means downstream of the liquid opening for generating a low pressure zone by using the hydraulic action of the flow liquid. Said gas entraining means induces the gas into the hollow center through the gas opening by continuously mixing said gas with the flowing liquid therein. The mixing action in the gas entraining means forms a two-phase flow downstream thereof. The entrained gas thereby flows downwardly with the liquid in the hollow center and subsequently enters in the channels of the rotor. The rotor continuously draws the gas and the liquid from the hollow center and injects them in the liquid body through the outward end of the channels of the rotor.

A special feature of the present invention is that the injected streams from the rotor contain liquid with a desired amount of gas which not only promote good bottom mixing but also an efficient gas-liquid mass transfer as well. Another special feature of the present invention is that the gas is entrained by the hydraulic force of the flowing liquid so that no additional moving part is required. Still another special feature of the present invention is that the gas is mixed with the liquid in the upper section of the hollow center so that the hydrostatic force to be overcome for the gas entrainment is very low and as a consequence any desirable amount of gas flow can be obtained by adequately adjusting the liquid flow velocity and the relevent gas entrainment parameters.

The downward flow velocity must be designed higher than one foot per second, the velocity at which the drag on gas bubbles exceeds the buoyancy of the gas. In general the flow velocity is designed many time greater than this critical value in order to reduce the shaft dimension and optimize the equipment costs. As the mixture flows downwardly in the hollow center the hydraulic pressure increases with the depth. The mean density of the gas-liquid mixture in the hollow center is less than that of the reactor liquid at the same level. This pressure difference at the depth of the rotor can be considered as the static pumping head of the rotor. The dynamic head of the rotor accounts for the kinetic energy contained in the discharged jet streams from the rotor. When the rotor is used in combination with a surface aerator the rotational speed of the shaft is previously determined by the optimization of the surface aerator efficiency, and the minimum liquid flow rate of the rotor is determined by mixing requirement. With a given rotational speed and flow rate the rotor is designed to supply the appropriate static head for the desired gas to liquid mixing ratio and the dynamic head for turbulent mixing of the bottom section of the reactor.

A preferred embodiment of the submerged rotor comprises a disc shaped structure of a finite thickness with a number of channels substantially radially outward from the disc center. The inlet of the channels is open to the hollow shaft while the outlet is open to the reactor liquid at the outer circumference of the the rotor. The basic parameters affecting the rotor performance are the rotor diameter, the number of the total channels, the diameter of the rotor and the width and discharge angle of the channels. With an appropriate combination of the above design parameters the rotor can be designed to deliver the desired pumping head at the given shaft rotational speed. Therefore, the rotor of the present invention can be used to enhance the surface aerator performance at its optimum operation point.

The gas entrainment can be accomplished by an area reduction nozzle such as a venturi nozzle which creates a low pressure zone downstream of the nozzle neck. The gas is introduced through a tube communicating the nozzle interior with the cover gas above the liquid surface. The hydraulic suction draws the gas into the nozzle and mixes it with the flowing liquid. The gas entrainment rate can be controlled by the area reduction ratio of the nozzle, the depth of the nozzle relative to the liquid surface and the dimension of the gas tube.

DESCRIPTION OF THE PREFERRED EMBODIMENT

Figure 1:
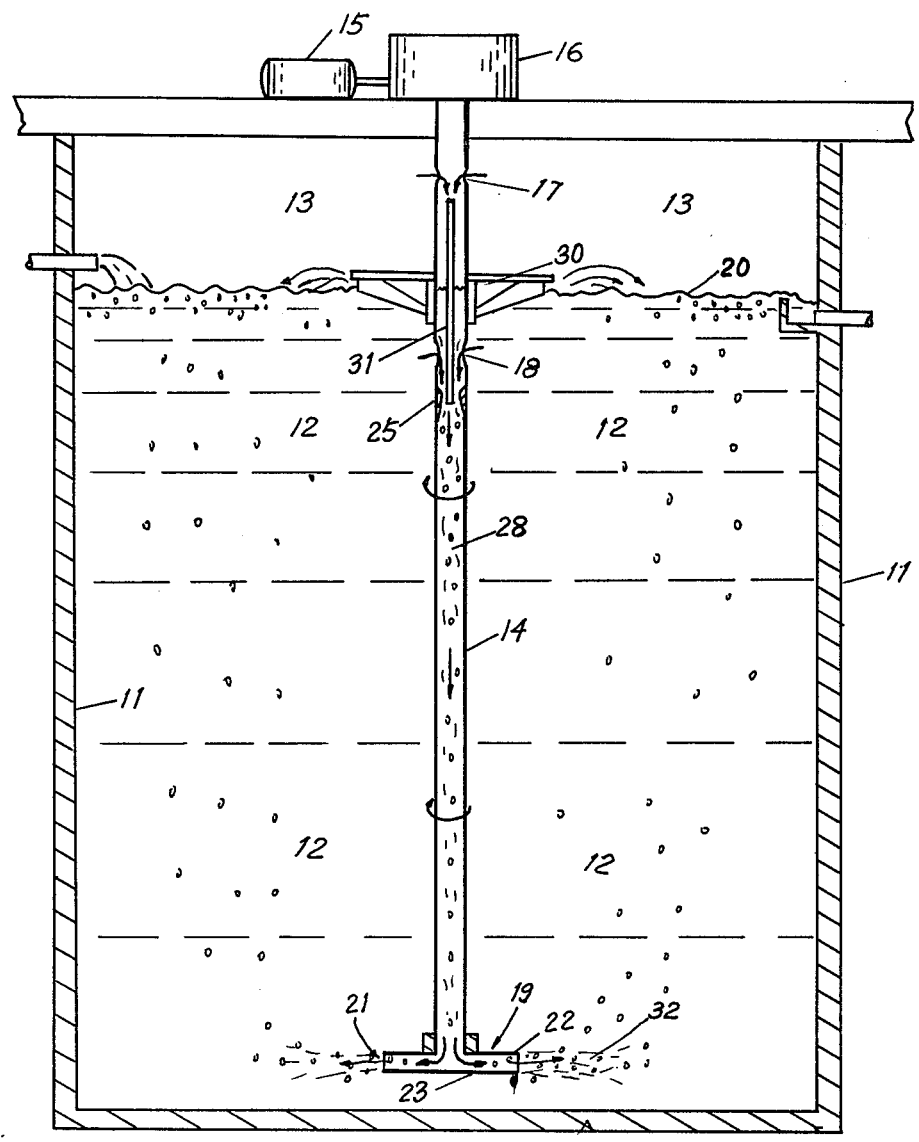

The advantages and features of the present invention will become more apparent in the light of the following description of the preferred embodiment thereof, as illustrated in the accompanying drawing.

FIG. 1 shows a vertical cross-section view of a preferred embodiment wherein the reactor vessel 11 contains the liquid 12 which is in contact with the cover gas 13. A rotational hollow shaft 14 is driven by the motor 15 through the gear reducer 16. The rotational shaft 14 with the hollow center 28 is substantially vertically disposed with its lower section submerged in the reactor liquid. The annular wall of shaft 14 has at least one opening 17 to the cover gas 13 and at least one opening 18 to the liquid 12 near the liquid surface 20 so that both liquid and gas can flow in the hollow center 28 freely through the openings. A rotor 19 is mounted on shaft 14 at the lower end of the shaft. Said rotor has a number of radially outward channels 21 confined by the upper shroud 22 and the lower shroud 23. The inward end of the channels communicates with the hollow center 28 of shaft 14 while the outward end of the channels are open to the reactor liquid 12 at the rotor circumference. This pumping action of the rotor affects a circulation flow that draws the liquid to flow in the hollow center through the liquid opening 18. There is a gas entraining device within the hollow center 28 down stream of the liquid opening 18. The preferred gas entraining device comprises a venturi nozzle 25 and a gas tube 31. The flowing liquid generates a low pressure section below the venturi neck which entrains gas to flow into the verturi means and mixes with the flowing liquid therein. The mixture of the flowing liquid and the entrained gas is subsequently injected in the liquid body 12 through the channels of the rotor to form a number of two-phase jet streams 32. The momentum of the jet streams 32 promotes an effective bottom mixing while the turbulent mixing of gas and liquid accomplishes an efficient mass transfer.

In the application of the present invention to aeration of wastewater it is especially advantageous to combine with a surface aerator. The additional gas injection in the jet streams 32 can enhance the mass transfer efficiency of the surface aerator 30 due to the fact that when the gas bubbles rise to the surface turbulent zone of the surface aerator additional gas is dissolved in the turbulent water without consuming additional shaft power.

I claim:

1. A process for mixing a gas with a liquid in a vessel comprising the steps;
    a. rotating a submerged rotor in said vessel containing said liquid by driving a substantially vertically disposed hollow shaft; said rotor comprising a plurality of substantially radially outward channels of which the inward end communicating with the hollow center of said hollow shaft and the outward end being open to said liquid in said vessel;
    b. continuously drawing said liquid by the pumping action of said rotor into said hollow center through at least one shaft wall opening to said liquid near the liquid surface and flowing said liquid downwardly within said hollow center;
    c. continuously inducing said gas to enter said hollow center through at least one shaft wall opening for said gas above said liquid surface and mixing said gas with the flowing liquid by a hydraulic gas entrainment said hydraulic gas entrainment being accomplished by a venturi means downstream of said shaft wall opening to said liquid, said flowing liquid forming a low pressure region in said venturi means and thereby entraining gas therein through a gas tube communicating said gas entering into said hollow center with said low pressure region in said venturi means;

d. continuously injecting said flowing liquid with the entrained gas into said liquid through said channels of said rotor by the pumping action of said rotor to form a plurality of rotary jet streams of a gas-liquid mixture.

2. A process as defined in claim 1 wherein said liquid being wastewater and said gas being air.

3. A process as defined in claim 1 wherein said liquid being wastewater and said gas being an oxygen enriched gas.

4. A process as defined in claim 1 wherein it further comprising a surface aeration for additonal gas-liquid mass transfer; said surface aeration being carried out by a surface aerator mounted on said hollow shaft.

5. An apparatus for mixing a gas with a liquid comprising a vessel for containing said liquid, prime mover disposed above said vessel for driving a substantially vertically disposed hollow shaft; the hollow center of said shaft being open to said liquid through at least one liquid opening near the surface level of said liquid and open to said gas through at least one gas opening above said surface level of said liquid, a submerged rotor being mounted on said shaft and submerged in said liquid at a desired depth; said rotor having a plurality of substantially radially outward channels of which the inward end communicating with said hollow center of said shaft and the outward end being open to said liquid in said vessel, a gas entraining means disposed in said hollow center of said hollow shaft and downstream of said liquid opening said gas entraining means comprising a venturi nozzle for producing a low pressure region therein, and a gas tube for communicating said gas entering said hollow center with said low pressure region; the pumping action of said rotor drawing said liquid of said vessel to flow in said hollow center of said shaft through said liquid opening and downwardly therein, the flowing liquid entraining said gas through said gas opening in said gas entraining means and forming a gas-liquid mixture therein, said rotor drawing said mixture to flow further downwardly in said hollow center of said shaft and subsequently injecting it in said liquid of said vessel through said channels of said rotor to form a plurality of rotary jet streams for mixing said liquid in said vessel and promoting gas-liquid mass transfer.

6. An apparatus as defined in claim 5 wherein it further comprising a surface aerator mounted on said shaft near the surface of said liquid in said vessel.

* * * * *